J. L. MORRIS.
AUTOMATIC CUT-OFF FOR SCALES.
APPLICATION FILED OCT. 28, 1920. RENEWED MAR. 7, 1922.

1,437,260.

Patented Nov. 28, 1922.

INVENTOR
JOLLY L. MORRIS

J. L. MORRIS.
AUTOMATIC CUT-OFF FOR SCALES.
APPLICATION FILED OCT. 28, 1920. RENEWED MAR. 7, 1922.
1,437,260.
Patented Nov. 28, 1922.
3 SHEETS—SHEET 2.
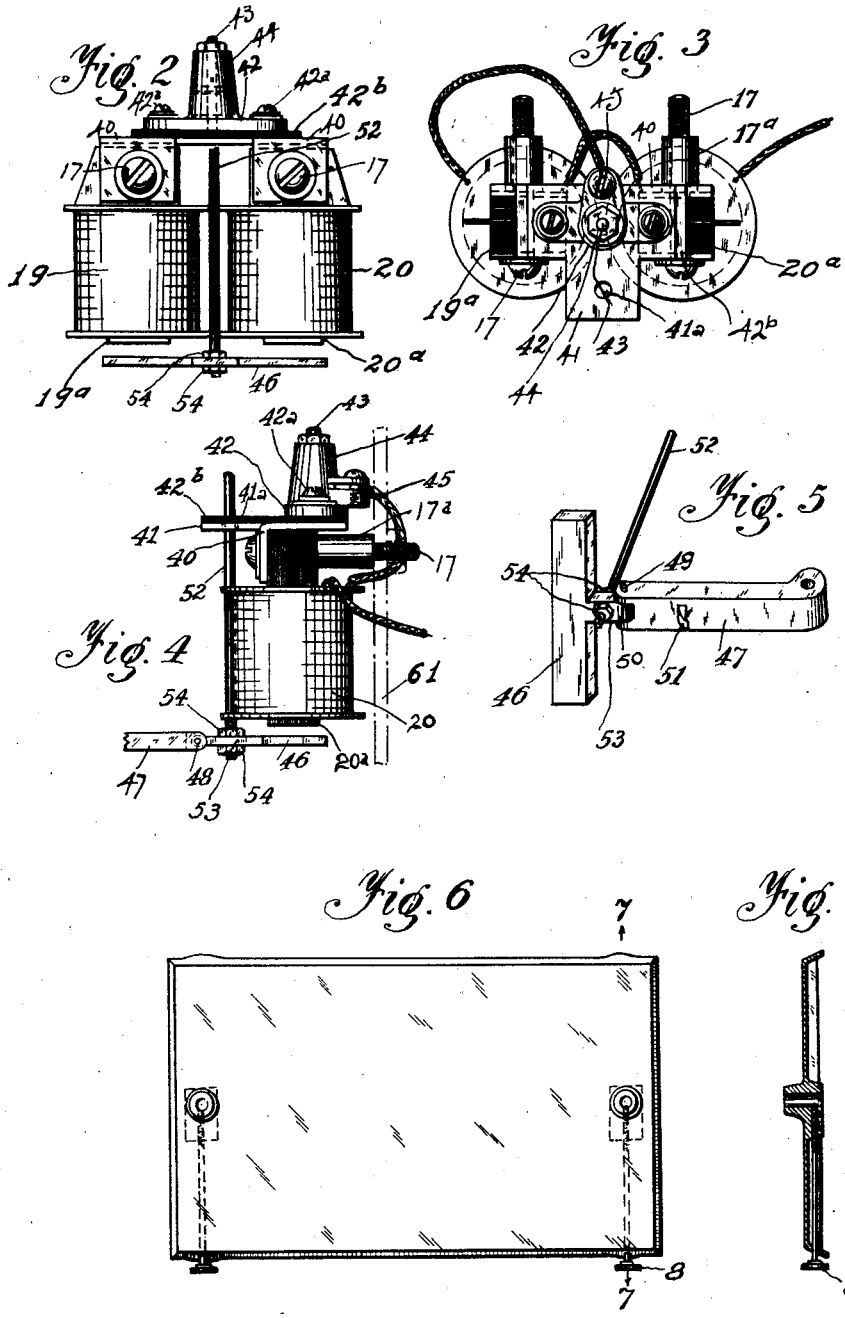
INVENTOR
JOLLY L. MORRIS
by Franklin H. Hough
Attorney

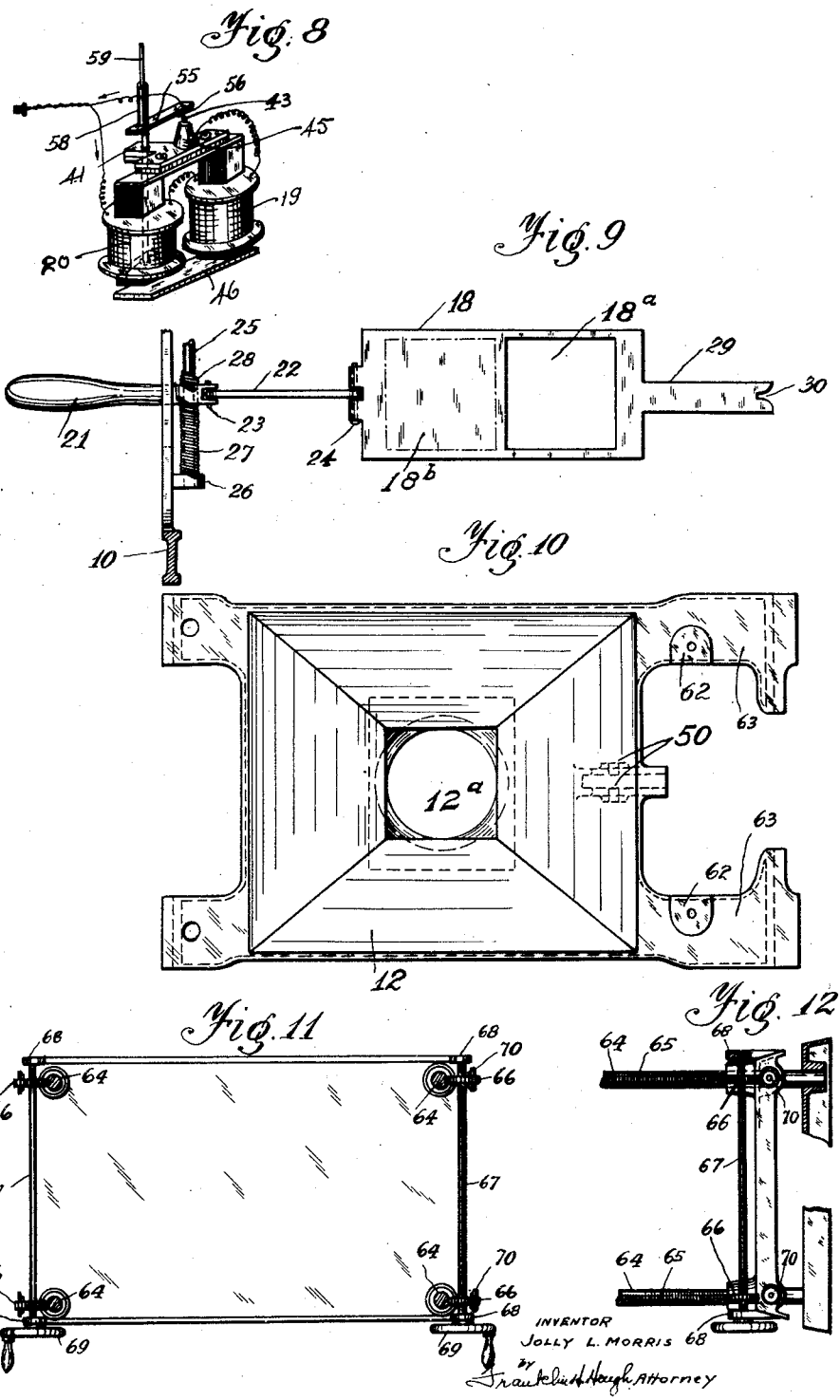

Patented Nov. 28, 1922.

1,437,260

UNITED STATES PATENT OFFICE.

JOLLY L. MORRIS, OF CRAFTON, PENNSYLVANIA.

AUTOMATIC CUT-OFF FOR SCALES.

Application filed October 28, 1920, Serial No. 420,118. Renewed March 7, 1922. Serial No. 541,867.

*To all whom it may concern:*

Be it known that I, JOLLY L. MORRIS, a citizen of the United States, residing at Crafton, in the county of Allegheny and State of Pennsylvania, have invented certain new and useful Improvements in Automatic Cut-Offs for Scales, of which the following is a specification, reference being had therein to the accompanying drawings.

This invention relates to new and useful improvements in weighing scales and more particularly to that type of weighing scales commonly known as counter platform scales.

The primary object of this invention is to provide a scale of this character which will automatically weigh a predetermined quantity of any free flowing commodity as it is supplied from a hopper.

Another object is to provide an electrically operated weighing scale embodying compensating means for accurately weighing a desired quantity of any free flowing commodity regardless of the weight thereof relative to its bulk.

A further object of this invention is to provide a scale possessing an adjustable platform which can be easily raised or lowered to suit the various sizes of packages or containers intended to hold the commodity being weighed.

Still a further object is to provide a weighing scale, possessed of the above mentioned advantages, which is of simple construction and operation and which can be manufactured inexpensively. Further objects and advantages of this weighing scale will appear from the following detailed description taken in connection with the accompanying drawings.

In the drawings—

Fig. 2 is a front elevation of the operating electro-magnets and associated parts.

Fig. 3 is a top view corresponding to Fig. 2.

Fig. 4 is a side elevation of said electro-magnets.

Fig. 5 is an enlarged perspective view of the armature of the electro-magnets and associated parts.

Fig. 6 is a top plan view of the adjustable platform used on the smaller sizes of weighing scales.

Fig. 7 is a cross-section taken along line 7—7 in Fig. 6.

Fig. 8 is a perspective view showing the electrical connections to the electro-magnets and associated parts.

Fig. 9 is a top plan view of the shutter and hand operating mechanism.

Fig. 10 is a top plan view of the hopper and depending support arms.

Fig. 11 is a modified construction of the platform used in the bigger sizes of weighing scales.

Fig. 12 is an end view of the modified platform shown partly in section.

Figure 1:
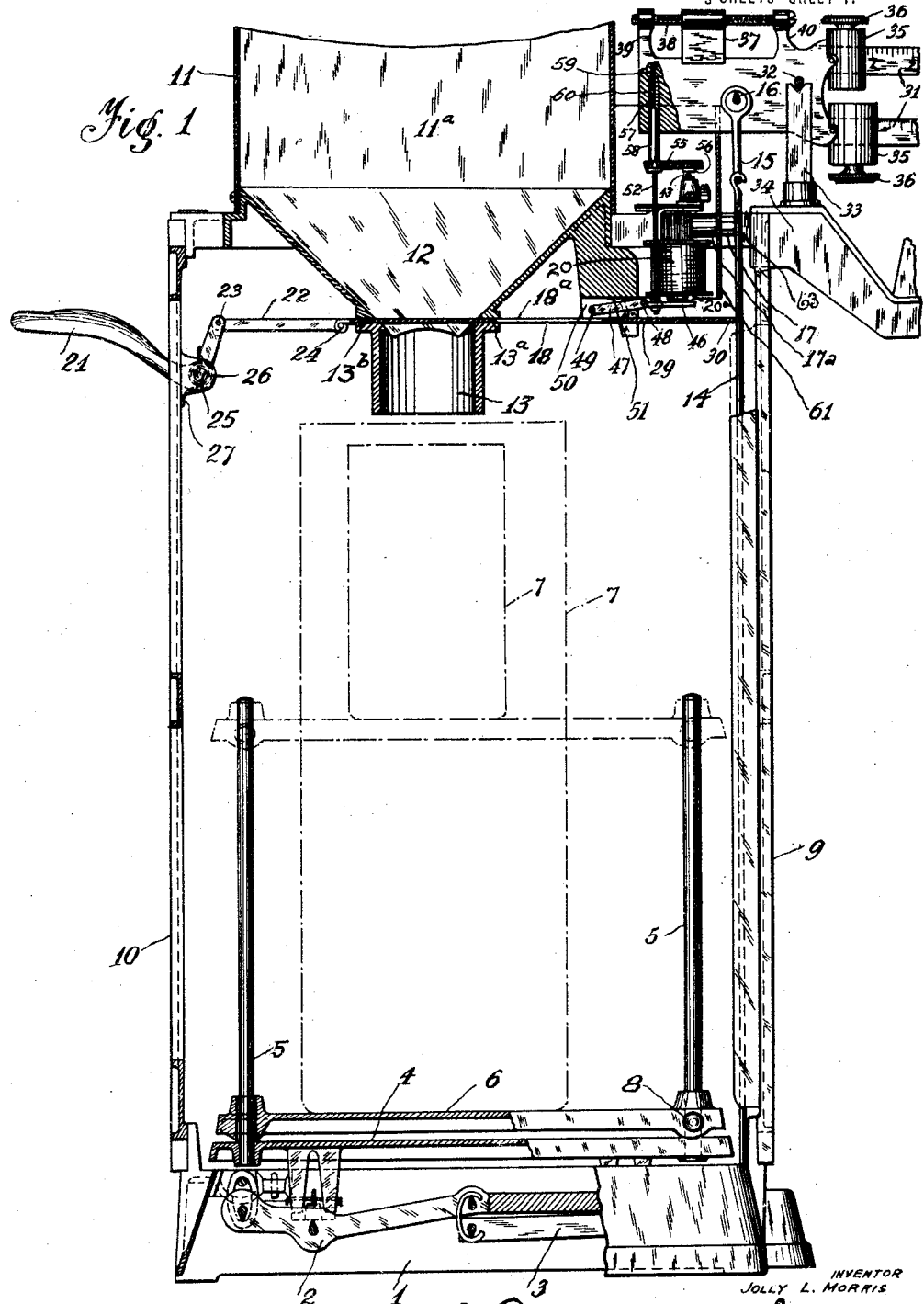
Fig. 1 is a side elevation of my weighing scale partly shown in section and with some of the parts, usually found in scales of this type, broken off.

This invention is especially intended to cover improvements on United States Patent No. 1,291,707, to Charles H. Allen, dated January 31, 1919, said improvements being the result of actual manufacture and operation of a great number of such weighing scales.

Referring more in detail to Fig. 1, my improved weighing scale consists of a hollow base 1 within which the usual long lever 2 and short lever 3 are mounted.

A permanent platform 4 rests upon said levers and is provided with the posts 5 along which the adjustable platform 6 can be raised to any desired height to suit the size of the containers 7 used to hold the commodity being weighed. Suitable means, such as the tightening thumb-screws 8, are provided to hold this adjustable platform to the desired height. The supporting frames 9 and 10 are securely mounted on the base 1 and support at their upper end the hopper 11 and the graduated beams 31.

The hopper 11 is preferably made of the rectangular shaped body 11$^a$, provided with a downwardly inclined convergent bottom 12 terminating with a discharge opening 12$^a$, to which the circular discharge neck 13 is secured. The upper part of the neck is provided in the front and rear wall with parallel slots 13$^a$ and 13$^b$ in which the shutter 18 is slidably mounted.

The opening 18$^a$ formed in the forward end of the shutter is commensurate in area to the discharge opening of the hopper, whereas the rear portion 18$^b$ of the shutter is solid and provides the means for shutting off the discharge opening. The shutter is manually operated by means of the bell-crank lever 21 and the connecting rod 22 which hingedly connects these two members by the pin connections 23 and 24. The bell-crank lever is securely and centrally mounted on a shaft 25 pivoted in the bearings 26 cast upon the supporting frame 10. Coil springs 27 and 28 are mounted on the shaft and on each side of the bell-crank lever 21 in such a manner that their tension will be increased when the bell-crank lever is drawn backward to the position corresponding to the open position of the shutter.

The shutter is also provided at its forward end with a narrow extension arm 29 the outer end of which has a central slot 30, the purpose of which shall be explained later. The double graduated beam 31 is supported by means of the knife-edge bearing 32 on the vertical standard 33 mounted on the frame member 34. Each of the graduated beams is provided with a slidable poise 35 having a tightening thumb-screw 36 mounted therein for the purpose of securing each poise on the beam, if desired. On the rear end of the graduated beam there is provided an adjustable compensating weight 37 which can be moved longitudinally by means of the screw 38 rotatably mounted on posts 39 and 40 integral with the graduated beam. This adjustable weight serves the double purpose of adjusting the scale into perfect equilibrium, when the scale is not loaded, and of providing means to compensate for the weight of the stream or column of the commodity which has not yet reached the container immediately after the closing of the shutter 18.

The graduated beam is connected with the platform levers by means of the rod 14 and the clevis 15 suitably hung on the knife-edge bearing pins 16, this construction following in general the usual practice in the manufacture of scales.

The rapid and automatic closing of the discharge opening 12$^a$ is achieved by means of an electro-magnetic control device consisting of the following principal parts: The two electro-magnets 19 and 20, are supported by a casing 61, by means of the screws 17 and the tube-spacers 17$^a$. The magnet cores 19$^a$ and 20$^a$ are connected together by the bent metal top plate 40 provided with the extension 41. A contact block 42 is secured on the top plate 40 by means of the insulated screws 42$^a$ but separated from said plate by the strip 42$^b$ of insulating material. The contact block 42 is provided with a contact point 43 adjustably mounted on the knob 44 supplied with the wire contact screw and lug indicated at 45. The T shaped armature 46 is positioned on the lower part of the magnet and is hingedly connected to a gravity lever 47 by means of the pin connection 48. This lever is rockably mounted on the pin 49 supported in lugs 50 cast integral with the hopper bottom. A catch finger 51 is secured on the lower side of the gravity lever and is made slightly narrower than the slot 30 provided in the extension arm 29 of the shutter.

A vertical push rod 52 is adjustably secured to the shorter leg 53 of the armature 46 by means of the threaded nuts 54, and guided at its upper end by the hole 41$^a$ provided in the extension 41 of the top plate 40. A vertically movable contact plate 55, provided with the electrical contact disc 56, is slidably mounted and guided in a hole 57 drilled in the lower part of the graduated beam by means of the guide rod 58 riveted to the contact plate, the upper end 59 of said guide rod being sufficiently reduced in diameter to procure the necessary space for the compression coil spring 60 inserted in the hole 57. The tendency of this spring is to force the contact plate 55 against the contact point 43.

The electric current required to operate the electro-magnet may be supplied from any suitable source such as storage battery or electric light circuit. In the perspective view shown in Fig. 8, I have shown the current as being derived from an electric light circuit. As will be seen in this figure, the electric circuit will be closed or opened at the contact point 43.

The complete electro-magnetic device of this scale is mounted and enclosed, for protection, in the casing 61 which is bolted on the pads 62 provided on the front arms 63 of the hopper bottom.

The primary object of the electro-magnetic mechanism is to enable the rapid and accurate weighing of a commodity into great number of packages of a desired weight, such as are now commonly prepared in advance for the retail trade. It is of course understood that the scale can be used, like any other ordinary counter platform scale for weighing miscellaneous merchandise.

Assuming that it be desired to weigh off a quantity of packages of a given weight of the same commodity, the operation will be as follows: The hopper 11 is filled with the commodity and the poises 35 are adjusted and secured on the graduated beams at the point corresponding to the desired weight. The compensating weight is also adjusted to the proper place to afford the proper compensation required for that kind of commodity. The movable platform is raised to suit the height of the container and, after said container is placed under the discharge neck 13, the bell-crank lever 21 is pressed downwardly by the operator, thereby causing the shutter to slide backwardly until its open portion 18$^a$ registers with the discharge opening 12$^a$ of the hopper. This backward movement of the shutter will bring the slot 30 slightly past the catch pin 51 and the latter will, owing to the weight of the armature 46 and gravity lever, fall into the slot 30 and hold the shutter in the open position, without the necessity of the operator further holding the bell-crank lever 21. This rearward movement of the lever will have increased the tension in the coil springs 27 and 28 with the result that the latter will rebound powerfully as soon as the catch pin disengages the slot 30 thereby forcing the shutter rapidly into its closing position.

As long as the inflowing commodity has not attained the required weight in the container, the rear end of the graduated beam 31 will be in a raised position and the electric contact between point 43 and the contact plate 55 will be open, so that the electromagnets will not be energized. But, as soon as the container has reached its predetermined weight, the graduated beam will incline in the opposite direction and the contact between the point 43 and plate 55 will be formed. The electric current will now energize the electro-magnets and the armature will be drawn up, thereby disengaging the catch-pin from the slot 30. The shutter will slide forward instantaneously and cut off the discharge of the commodity.

The push rod 52 is so adjusted that, as soon as the catch-pin 51 has released the shutter, it will strike against the under-side of the movable contact plate 55 and force it upwardly, thus breaking the flow of electricity at the contact point 43. This contact will remain broken as long as the catch-pin rests upon the extension arm 29, (that is as long as the discharge opening is closed); thus eliminating all waste of electric current, should any loaded container be left on the platform.

The operation of the scale will be repeated as many times as there are packages to be weighed off and it will be apparent from the foregoing description that considerable time and labor will be saved, as compared to the weighing on ordinary platform scales. A further advantage is the fact that, owing to the close adjustability of the electromagnetic device, very accurate and economical weighing of a commodity is obtained.

In Figures 11 and 12 I have shown a modified construction for adjusting the movable platform, which is used preferably in the bigger scales where containers of relatively great weight are measured off. In this case I provide four guide-posts 64 each provided with a rack 65 into which mesh the teeth of the gears 66 securely mounted in pairs on the shafts 67, guided in bearings 68 and operated by the hand-wheels 69. After the movable platform has been raised to the required height, it may be locked in this position by any of the well known means, such as for example the thumb-screws 70 shown in the drawings.

As will be understood and suggested herein, there may be slight changes made in the construction and arrangement of the details of my invention without departing from the field and scope of the same, and I intend to include all such variations, as fall within the scope of the appended claims, in this application in which the preferred forms only of my invention are disclosed.

What I claim to be new is:

1. In a scale the combination of a pivoted beam and a chute, provided with an aperture, a closure for the chute, a manually compressible spring for closing the chute, a detent for maintaining the closure in open position against the tension of the spring, an electro-magnet for actuating the detaining means, means forming an electric circuit for the electro-magnet including a contact, means actuated by the magnet for breaking the circuit at the contact irrespective of the position of the beam, and means carried by the beam for closing the contact when actuated.

2. In a scale the combination with a pivoted beam, of a chute, a spring-pressed manually operable apertured closure for the chute, a detent positioned to maintain the closure in open position against the tension of the spring, an electro-magnet, an armature for the magnet, means actuated from the armature to actuate the detent, means forming an electric circuit for the magnet including a contact, means carried by the armature for breaking the circuit at the contact when the magnet is energized, means to maintain the break irrespective of the position of the beam and means co-acting with the beam for closing the break in the circuit when the detent is in restraining position.

3. In a scale the combination with a pivoted beam of a chute, an apertured closure for the chute, manually-operable spring-pressed mechanism for closing the chute, a detent for restraining the closing of the chute, an electro-magnet adapted when energized to withdraw the detent and permit the closing of the chute, means forming a circuit for the electro-magnet including a contact, means actuated by the position of the detent when withdrawn to break the circuit at the contact, means permitting the movement of the beam without affecting the closing of the circuit when the detent is withdrawn, means to retain the break in the circuit when the detent is in restraining position, means whereby the beam closes the contact when the detent is in restraining position, and means whereby the movement of the detent from restraining position breaks the circuit.

4. In a scale, the combination of a pivoted beam and a chute, an apertured closure for the chute, manual means for holding the apertured closure normally open, a latch adapted to release the apertured closure, an electro-magnet, an armature for the electro-magnet, adapted to actuate the latch, a circuit for the electro-magnet, normally open, means actuated by the swaying of the beam for closing the circuit to the electro-magnet, and means actuated from the armature for breaking the circuit, irrespective of the position of the beam.

In testimony whereof I hereunto affix my signature in presence of two witnesses.

JOLLY L. MORRIS.

Witnesses:
L. GERTRUDE PAYNE,
ERNEST PAYNE.